US010575673B2

(12) United States Patent
Spiegel et al.

(10) Patent No.: US 10,575,673 B2
(45) Date of Patent: Mar. 3, 2020

(54) CAPSULE FOR USE WITH A FOOD PREPARATION MACHINE

(71) Applicant: NESTEC S.A., Vevey (CH)

(72) Inventors: Akos Spiegel, Chables (CH); Nicolas Jean-Guy Bezet, Macon (FR)

(73) Assignee: Societe des Produits Nestle S.A., Vevey (CH)

( * ) Notice: Subject to any disclaimer, the term of this patent is extended or adjusted under 35 U.S.C. 154(b) by 1279 days.

(21) Appl. No.: 14/421,569

(22) PCT Filed: Aug. 23, 2013

(86) PCT No.: PCT/EP2013/067576
§ 371 (c)(1),
(2) Date: Feb. 13, 2015

(87) PCT Pub. No.: WO2014/029884
PCT Pub. Date: Feb. 27, 2014

(65) Prior Publication Data
US 2015/0196159 A1 Jul. 16, 2015

(30) Foreign Application Priority Data

Aug. 24, 2012 (EP) .................................. 12181653

(51) Int. Cl.
*A47J 31/40* (2006.01)
*B65D 85/804* (2006.01)
(52) U.S. Cl.
CPC .......... *A47J 31/407* (2013.01); *B65D 85/804* (2013.01); *B65D 85/8043* (2013.01)

(58) Field of Classification Search
CPC . A47J 31/0673; A47J 31/407; B65D 85/8043; B65D 85/804
(Continued)

(56) References Cited

U.S. PATENT DOCUMENTS

2011/0142996 A1* 6/2011 Kruger ............... B65D 85/8043
426/80
2011/0183055 A1* 7/2011 Mariller .............. A47J 31/0673
426/433
(Continued)

FOREIGN PATENT DOCUMENTS

CN 202011558 10/2011
EP 1967099 9/2008
(Continued)

*Primary Examiner* — Phuong T Nguyen
(74) *Attorney, Agent, or Firm* — K&L Gates LLP

(57) ABSTRACT

The present invention is directed to a capsule (1) for containing a food ingredient, suitable for being inserted in a food preparation machine (2), said capsule having a rigid body structure defining a closed compartment wherein said ingredient is mixed with a fluid introduced under pressure by said machine in order to produce a food product, said body walls defining an external volume $V_{caps}$, and an internal compartment volume $V_{comp}$, characterized in that said capsule body structure further comprises at least one portion (14) having a shape, dimensions and/or being made of a material such that it is elastically deformable and that $V_{caps}$ and $V_{comp}$ can be reversibly reduced by at least 3% by applying an elastic compression along at least one dimension of said capsule at the time said capsule is functionally inserted within said machine, said elastic body wall portion allowing the capsule to flex back to its initial volumes $V_{caps}$ and $V_{comp}$ after extraction, such that residual pressure within said capsule is reduced.

10 Claims, 4 Drawing Sheets

(58) Field of Classification Search
USPC ......... 99/295, 291, 285, 323, 300, 453, 452;
426/433, 431, 425, 110, 112, 115, 77, 80,
426/84
See application file for complete search history.

(56) References Cited

U.S. PATENT DOCUMENTS

| 2012/0180670 A1 | 7/2012 | Yoakim et al. |
| 2014/0227414 A1 | 8/2014 | Perentes et al. |
| 2015/0250353 A1 | 9/2015 | Rapparini |

FOREIGN PATENT DOCUMENTS

| EP | 1784344 | 4/2009 |
| WO | 2011117768 | 9/2011 |

\* cited by examiner

CAPSULE FOR USE WITH A FOOD PREPARATION MACHINE

CROSS REFERENCE TO RELATED APPLICATIONS

The present application is a National Stage of International Application No. PCT/EP2013/067576, filed on Aug. 23, 2013, which claims priority to European Patent Application No. 12181653.2, filed on Aug. 24, 2012, the entire contents of which are being incorporated herein by reference.

FIELD OF THE INVENTION

The present invention concerns a capsule for containing a food precursor, suitable for use with a food preparation machine.

BACKGROUND OF THE INVENTION

Beverage preparation machines are well known in the food industry and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine is a beverage preparation machine working with a rigid or semi-rigid capsule.

The machine preferably comprises a receptacle for accommodating said capsule and a fluid injection system for injecting a fluid, preferably water, under pressure into said capsule. Water injected under pressure in the capsule, for the preparation of a coffee beverage, is preferably hot, that is to say at a temperature above 70° C. However, in some particular instances, it might also be at ambient temperature, or even at a chilled temperature. The pressure inside the capsule chamber during extraction and/or dissolution of the capsule contents is typically about 1 to about 8 bar for dissolution products and about 2 to about 12 bar for extraction of roast and ground coffee. The present invention could also encompass the so-called "brewing" process of beverage preparation—particularly for tea and coffee. Brewing involves a time of infusion of the ingredient by a fluid (e.g. hot water), whereas the extraction or dissolution preparation process allows a consumer to prepare a beverage, for instance coffee, within a few seconds.

Generally, in the following specification, the term "brewing" of an ingredient by a fluid, is meant to encompass extraction of a powdered edible material such as for instance roast and ground powdered coffee, or dissolution of edible soluble material such as for instance soluble tea or coffee, milk, cocoa mixes, or infusion of an edible material with an infusion fluid under very low relative pressure, or atmospheric pressure, for a longer time than that required for extraction or dissolution, for instance infusion of tea leaves by hot water.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is Water—for storing the fluid that is used to dissolve and/or infuse and/or extract under pressure the ingredient(s) contained in the capsule. The machine comprises a heating unit such as a boiler or a heat exchanger, which is able to warm up the water used therein to working temperatures (classically temperatures up to 80-90° C.). Finally, the machine comprises a pump element for circulating the water from the tank to the capsule, optionally though the heating unit. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules typically comprise:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminium membrane disposed at the bottom end of the capsule, closing the capsule, for retaining the internal pressure in the chamber, the membrane being associated with piercing means for piercing dispensing holes in the aluminium membrane when the internal pressure inside the chamber reaches a certain predetermined value,
- optionally, means configured to break the jet of fluid so as to reduce the speed of the jet of fluid injected into the capsule and distribute the fluid across the bed of substance at a reduced speed. It is often important for the user to know when the water level in the machine tank is too low to prepare a full beverage.

In many instances, the capsules for use in beverage preparation machines are closed capsules. Such closed capsules are interesting because they protect the ingredient contained therein from ambient gas and moisture and allow long conservation time. Typically, such closed capsules are made from gas and/or moisture impermeable material and feature a rigid or semi-rigid body having a one of its walls—for instance the top wall—made from a membrane which is to be pierced by the fluid injection needle of the beverage preparation machine. When liquid is injected in the capsule compartment, a pressure is built up, which serves as an extraction means for extracting ingredients contained inside the capsule through a dispensing wall of the capsule—typically the bottom wall—.

In prior art capsules, when the fluid injection needle of the machine is removed from the capsule, after the beverage has been prepared and dispensed, the capsule top membrane is pierced and a hole "H" remains as illustrated in FIG. 1. However, in such a case, the extraction fluid pressure "P" remains at least partly in the capsule compartment.

In case the capsule contains soluble ingredient to extract, the capsule compartment generally comprises one single portion, and the residual fluid pressure is distributed across the compartment volume.

In all cases, due to the residual pressure P which remains inside the capsule compartment after the capsule has been used, a jet of liquid "JL"—often referred to as "whale effect"—can spray out of the capsule top membrane, through the hole pierced by the machine needle, due to gas that may remain trapped within the capsule under pressure. Such a whale effect is represented in FIG. 1. Although such a phenomenon occurs randomly and very infrequently, it is undesirable because hot liquid splashing out is messy. Moreover, in case said liquid is water mixed with an ingredient such a leakage of liquid from the capsule top membrane is also undesirable for a cleanliness point of view as it could create some bacteria growth around or inside the machine, which forces the consumer to spend time cleaning the machine and its surroundings after usage.

It is therefore one main objective of the present invention to provide a solution for beverage preparation system which prevents the so-called "whale effect" described above.

SUMMARY OF THE INVENTION

The objectives set out above are met with a capsule for containing a food ingredient, suitable for being inserted in a food preparation machine, said capsule having a rigid body structure defining a closed compartment wherein said ingredient is mixed with a fluid introduced under pressure by said machine in order to produce a food product, said body walls defining an external volume $V_{caps}$, and an internal compartment volume $V_{comp}$, characterized in that said capsule body structure further comprises at least one portion having a shape, dimensions and/or being made of a material such that it is elastically deformable and that $V_{caps}$ and $V_{comp}$ can be reversibly reduced by at least 3% by applying an elastic compression along at least one dimension of said capsule at the time said capsule is functionally inserted within said machine, said elastic body wall portion allowing the capsule to flex back to its initial volumes $V_{caps}$ and $V_{comp}$ after extraction, such that residual pressure within said capsule is reduced.

The elastic portion is preferably deformable with an amplitude comprised between 1 mm and 20 mm, preferably comprised between 1.5 mm and 10 mm, more preferably comprised between 2 mm and 5 mm.

In a preferred embodiment of the present invention, the external volume $V_{caps}$ and the internal compartment volume $V_{comp}$ of the capsule can be reduced by at least 10%, more preferably by at least 15%.

In a highly preferred embodiment of the invention, the elastic portion comprises a bellows portion of the capsule side walls.

In any case, the elastic portion can be deformable in translation and/or in torsion, and/or in flexion.

Advantageously, the capsule according to the present invention is moisture and oxygen impermeable, so as to keep its contents fresh as long as possible during storage, in particular when the ingredient contained therein is roast and ground coffee.

Another aspect of the present invention concerns a beverage preparation system comprising:
  a closed capsule with a rigid body structure defining a closed compartment for containing a food ingredient, said capsule having an external volume $V_{caps}$ and an internal compartment volume $V_{comp}$, and
  a food preparation machine having a cavity for functionally inserting said capsule and injecting a beverage preparation fluid under pressure thereinto, said machine cavity having an internal volume $V_{cav}$,
  characterized in that said capsule body structure further comprises at least one portion having a shape, dimensions and/or being made of a material such that it is elastically deformable and that $V_{caps}$ and $V_{comp}$ can be reversibly reduced by at least 3% by applying an elastic compression along at least one dimension of said capsule at the time said capsule is functionally inserted within said machine, said elastic body wall portion allowing the capsule to flex back to its initial volumes $V_{caps}$ and $V_{comp}$ after extraction, such that residual pressure within said capsule is reduced.

In a preferred embodiment of the invention, the machine cavity comprises a capsule holding portion and a fluid injection portion that is movable from, and towards, said capsule holding portion in order to open, respectively close, said cavity, and wherein the external capsule volume $V_{caps}$ and the internal compartment volume $V_{comp}$ are reduced by the fluid injection portion applying an elastic compression force on the top of said capsule during closing of said cavity and when said cavity is closed.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
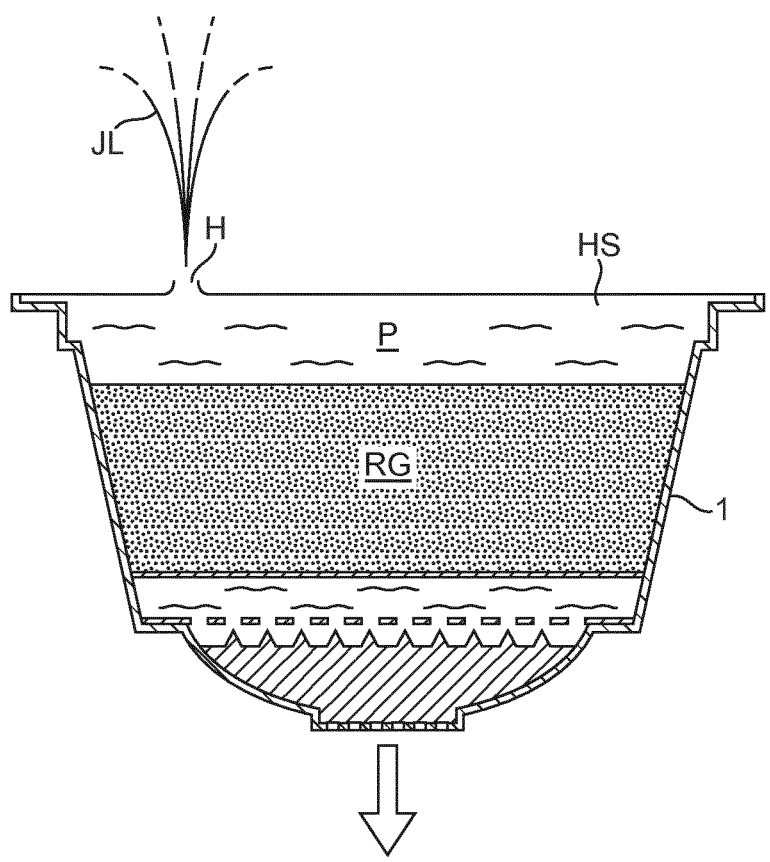
FIG. 1 is a beverage preparation capsule of the prior art.
Figure 2:
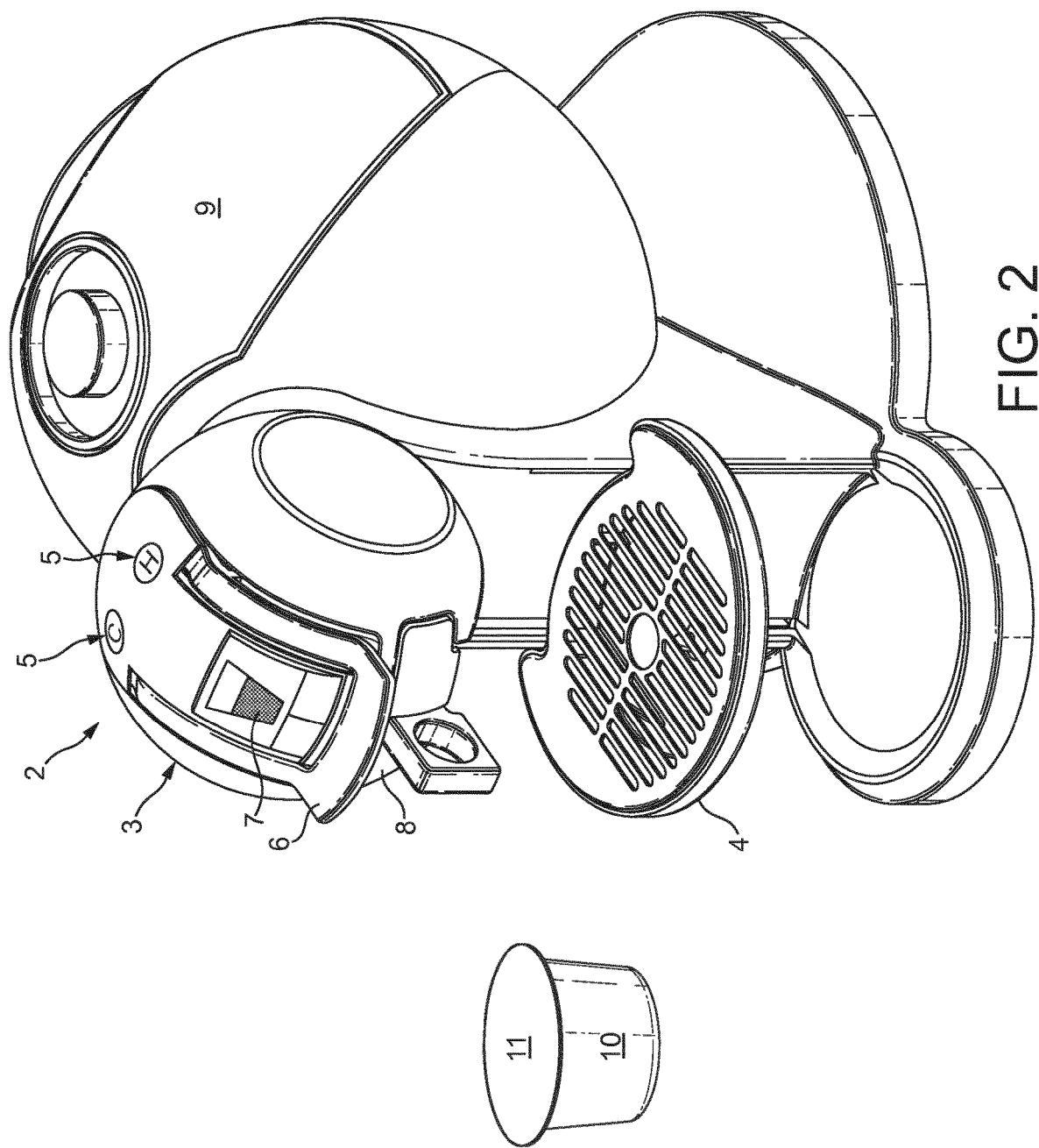
FIG. 2 is a schematic view of a beverage preparation system suitable for use with a capsule of the invention.

The capsule 1 according to the invention is suitable for use in a beverage preparation machine 2 illustrated in FIG. 2.

The beverage preparation machine 2 comprises a water reservoir 9, a brewing head 3 comprising a cavity adapted to receive an ingredient capsule 1 containing a beverage preparation ingredient. The machine 2 comprises a cup tray 4 for placing a cup wherein the beverage flows from the capsule 1. The cup tray 4 can be set at different heights relative to the brewing head 3, control panel and control buttons 5.

The brewing head 3 comprises a handle 6 for opening and closing said brewing head.

In a possible embodiment, the control buttons 5 comprise more particularly a rotating wheel (not illustrated in the drawing) and the control panel is a screen 7. An ingredient capsule 1 can be placed in a capsule holder 8 which is removably inserted into the brewing head 3. The screen 7 is suitable for displaying various information to the consumer, for instance the volume level that is dispensed in the cup. The user can also choose the temperature of the beverage that will be prepared, by actuating hot or cold buttons 5 which are present close to the wheel and screen on the surface of the brewing head 3.

The capsule holder 8 forms a capsule holding portion of the brewing head cavity, and the rest of the cavity is formed by a fluid injection portion 16. The fluid injection portion 16 comprises a needle plate carrying a water injection needle able to pierce the capsule to inject water therein under pressure, the needle being in fluid communication with the fluid system of the machine, in particular with the reservoir via the pump. The needle plate is movable from, and towards, said capsule holding portion in order to open, respectively close, said cavity. In order for the capsule to be functionally inserted within the brewing head 3 of the machine, the capsule must be loaded inside the capsule holder 8, and the injection portion of the cavity must be moved towards the capsule holder such that the cavity is closed in a water-tight manner.

The machine further comprises a reservoir 9 for a fluid—preferably water—, a pump (not shown) like a pressure pump for pumping a predetermined volume of the fluid from the reservoir 9 to the brewing head 3, such that the fluid can be injected into the capsule to mix with the ingredient under pressure, and thereby produce a predetermined volume of beverage which then is dispensed in the cup or other container (not shown) placed onto the tray 4.

The capsule 1 comprises a capsule body which has a generally frusto-conical body, closed at its bottom by a bottom wall integrally formed with the body side walls. The centre of the bottom wall comprises an opening which serves as a dispensing opening to let the beverage prepared therein, flow out of said capsule into a cup placed here below. The capsule further comprises a pierceable aluminum membrane that is sealed inside the capsule, close to the bottom wall, as well as a piercing plate for piercing said aluminum membrane when pressure inside the capsule increases. The piercing plate is located between the aluminum membrane and the bottom wall of the capsule. Finally, the capsule is closed at its top by a pierceable membrane. The capsule is made such that it is moisture and oxygen barrier. When the consumer actuates the locking handle 6 downwards as shown in FIG. 2, the needle plate is moved downwards and the brewing head 3 is closed. In that position, the machine fluid injection needle pierces through the top wall 11 of the capsule, and is in proper configuration for water injection under pressure therein.

Figure 3:
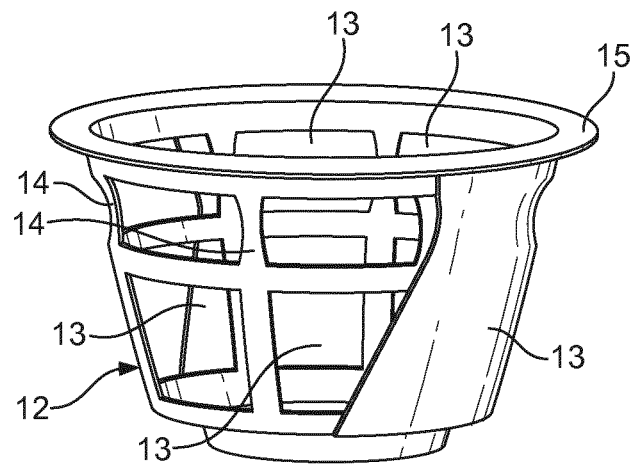
FIG. 3 is a schematic view of the semi-rigid structure of an elastically deformable capsule according to the invention.

A preferred embodiment of a capsule 1 according to the present invention is more particularly represented in FIG. 3. In that embodiment, the capsule body is made of a semi-rigid skeleton structure 12 (shown in FIG. 3) which is covered by an oxygen barrier membrane 13. The membrane 13 is for instance co-injection molded with the semi-rigid structure 12 by using an In-Mould Labeling (IML) process, as described for instance in Applicant's European patent application EP AN 11178061.

The semi-rigid skeleton structure 12 comprises at least one weakened zone that forms a bellows portion 14. For instance, the rest of the structure can be rigid, except this bellows portion 14 which is flexible. The flexibility of this portion 14 in the structure is achieved preferably by a smaller cross section compared to the rest of the structure as can be seen in FIG. 3. It can also be achieved (as an alternative or in addition to the smaller cross section) by a softer material which is co-injected with the rest of the structure 12.

Figure 4A:
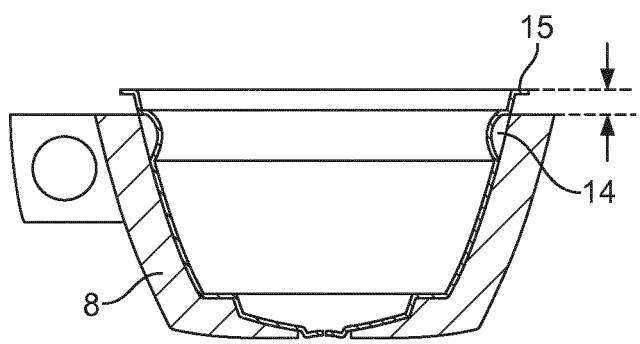
FIGS. 4A and 4B are schematic views of a capsule of the invention in its normal state, respectively in its compressed state.

In the embodiment shown in FIG. 4A, the bellows portion 14 is located at the top portion of the vertical area of the semi-rigid structure, such that the capsule can deform along a substantially vertical axis, i.e. when a vertical compression force is applied on said capsule.

When the capsule 1 is placed in the capsule holder and the brewing head 3 of the machine is open, as illustrated in FIG. 4A, the entire external surface of the capsule is in contact with the capsule holder, except for the top edge 15 of said capsule, which is lifted above the level of the upper surface of the capsule holder 8. In other words, the capsule height is greater than the capsule recess of the capsule holder 8. This height difference is indicated with arrows in the drawing. In that position, the capsule 1 has an external volume $V_{caps}$ which is greater than the internal volume of the machine cavity $V_{cav}$.

Figure 4B:
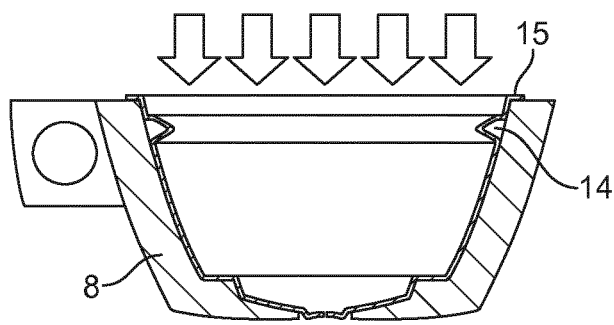
Figure 5:
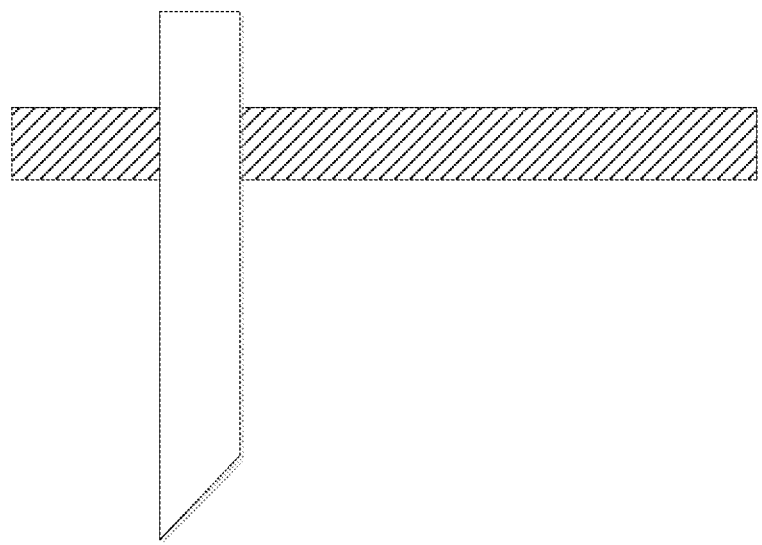

When the brewing head 3 of the machine is closed, the needle plate schematically illustrated with a series of arrows in FIG. 4B, presses onto the capsule, and compresses the latter so that it functionally fits into the cavity volume $V_{cav}$ defined between the capsule holder and said needle plate. The capsule flexes in the region of the flexible bellows portion 14 of its structure 12, as shown in FIG. 4B, until the top edge 15 of said capsule is pinched between the upper surface of the capsule holder and the lower surface of the needle plate. In that position, the capsule is functionally in place within the brewing head of the machine, the water injection needle (not shown in FIG. 4B) has pierced the top membrane of the capsule, and a brewing cycle can start in a leak-tight manner.

When the extraction head of the machine is opened again, the capsule flexes back into its original position shown in FIG. 4C, and the capsule external volume expanses back from a volume substantially equal to $V_{cav}$, to its normal, greater, volume $V_{caps}$.

Importantly, the variation of the capsule external volume $V_{caps}$ and internal compartment volume $V_{comp}$, was found to have a great impact on the resolution of the backflow issue: at the time the brewing head of the machine is closed, the needle pierces the top membrane 11 and the capsule is compressed according to the principle described above.

At that time, i.e. when the capsule is functionally inserted within the machine and the brewing cycle starts, the internal compartment volume $V_{comp}$ of the capsule decreases to a compressed functional volume, due to the reduction of the external volume $V_{caps}$ that substantially reaches the volume of the machine brewing cavity $V_{cav}$. Then the injection of water under pressure starts within the capsule volume, the pressure inside the capsule compartment increases, and a beverage is prepared, and then dispensed out of the capsule when the latter opens. When the dispensing of beverage is finished, a residual pressure of between 0.5 and 4 bar may remain within the capsule compartment, which may cause backflow or whale effect issues due to trapped gas under pressure, that expands when the injection needle is removed from the capsule and the injection hole is opened, by which water under pressure sprays out of the capsule through the injection hole pierced through the top wall 11 of the capsule. However, the invention solves the backflow issue by providing a pressure releasing feature built-in with the capsule: after beverage dispensing, when the brewing head 3 is opened and the water injection needle moves out from the top membrane 11 of the capsule, the external volume $V_{caps}$ and the internal compartment volume $V_{comp}$ of said capsule increase as explained above, allowing trapped gas to decompress, which causes the internal pressure within the capsule to decrease as well. It was found that the pressure decrease during opening of the brewing head is sufficient to compensate the residual fluid pressure within the capsule compartment, if one is present. The fluid remaining within the capsule compartment is therefore no longer under substantial pressure and the backflow of said fluid through the injection hole is cancelled.

The use of a bellows structure as deformable portion for the capsule allows a reversible reduction of the external volume $V_{caps}$ and of the internal compartment volume $V_{comp}$ of said capsule of at least 10%, and in some cases, depending on the design of the bellows, of at least 20%, which is sufficiently substantial to solve the backflow issue.

More precisely, the whale effect is created by compressible media (gas) trapped within the capsule during the extraction sequence that expands when the brewing head is opened and the injection needle is removed from the top of the capsule thereby unclogging the injection hole that was pierced therethrough. In the latter case, the trapped gas decompresses, expands, and pushes liquid contained in the capsule out, through the open injection hole pierced in the top membrane.

For instance, for a capsule having a top membrane surface of 18.1 cm$^2$, which is pierced with an injection needle having a diameter of about 1.4 mm (substantially equivalent to the diameter of the injection hole pierced through the top membrane), a compression of the capsule height with an amplitude of 3 mm along its vertical axis corresponds to a reduction of 5.43 cm$^3$, i.e. 5.43 ml of the capsule internal compartment volume $V_{comp}$ (differential volume).

With such a capsule, in case of 4 bar residual pressure within the capsule compartment (5 bar absolute pressure) after extraction of a beverage from the capsule, and the presence of 1.36 ml residual volume of gas bubbles in the compressed state within the capsule, all the residual pressure within the capsule is cancelled with a capsule of the invention having a 3 mm height recovery amplitude. In that case, the residual pressure is cancelled by the capsule expanding back to its initial volume, when the brewing head of the machine is opened, and no whale effect or product backflow is observed.

On the contrary, with an uncompressible capsule of the prior art having a 1.4 mm diameter hole on the top membrane, a backflow and/or whale effect is observed which in the worst case scenario results in a water jet of 62 cm height and 1 second duration.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule for containing a food ingredient, suitable for being inserted in a food preparation machine, the capsule having a rigid body structure defining a closed compartment wherein the ingredient is mixed with a fluid introduced under pressure by the food preparation machine in order to produce a food product, the rigid body structure comprising body walls defining an external volume $V_{caps}$ and an internal compartment volume $V_{comp}$, the rigid body structure further comprises at least one elastic portion having at least one characteristic selected from the group consisting of a shape, a dimension, and being made of a material, such that the at least one elastic portion is elastically deformable and that $V_{caps}$ and $V_{comp}$ are reversibly reduced by at least 3% by applying an elastic compression along at least one dimension of the capsule at the time the capsule is functionally inserted within the food preparation machine, the at least one elastic portion allowing the capsule to flex back to initial volumes $V_{caps}$ and $V_{comp}$ after extraction, such that residual pressure within the capsule is reduced.

2. The capsule according to claim 1, wherein the at least one elastic portion is deformable with an amplitude of between 1 mm and 20 mm.

3. The capsule according to claim 1, wherein the external volume $V_{caps}$ and the internal compartment volume $V_{comp}$ of the capsule are reduced by at least 10%.

4. The capsule according to claim 1, wherein the at least one elastic portion comprises a bellows portion of the body walls.

5. The capsule according to claim 4, wherein the external volume $V_{caps}$ and the internal compartment volume $V_{comp}$ of the capsule are reduced by at least 20%.

6. The capsule according to claim 1, wherein the at least one elastic portion is deformable in translation.

7. The capsule according to claim 1, wherein the at least one elastic portion is deformable in torsion.

8. The capsule according to claim 1, which is moisture and oxygen impermeable.

9. A beverage preparation system comprising:
a closed capsule with a rigid body structure defining a closed compartment for containing a food ingredient, the closed capsule having an external volume $V_{caps}$ and an internal compartment volume $V_{comp}$; and
a food preparation machine having a cavity for functionally inserting the closed capsule and injecting a beverage preparation fluid under pressure thereinto, the cavity having an internal volume $V_{cav}$,
the rigid body structure of the capsule comprises at least one elastic portion having at least one characteristic selected from the group consisting of a shape, a dimension, and being made of a material, such that the at least one elastic portion is elastically deformable and that $V_{caps}$ and $V_{comp}$ are reversibly reduced by at least 3% by applying an elastic compression along at least one dimension of the capsule at the time the capsule is functionally inserted within the food preparation machine, the at least one elastic portion allowing the capsule to flex back to initial volumes $V_{caps}$ and $V_{comp}$ after extraction, such that residual pressure within the capsule is reduced.

10. The beverage preparation system according to claim 9, wherein the cavity of the food preparation machine comprises a capsule holding portion and a fluid injection portion that is movable from and towards the capsule holding portion in order to open and respectively close the cavity, and wherein the external volume $V_{caps}$ and the internal compartment volume $V_{comp}$ are reduced by the fluid injection portion applying an elastic compression force on a top of the capsule during closing of the cavity and when the cavity is closed.

* * * * *